United States Patent
Zhang et al.

(10) Patent No.: US 11,184,195 B2
(45) Date of Patent: Nov. 23, 2021

(54) ENHANCED SRS FREQUENCY HOPPING SCHEME FOR 5G NR

(71) Applicant: Nokia Technologies Oy, Espoo (FI)

(72) Inventors: Yi Zhang, Beijing (CN); Deshan Miao, Beijing (CN); Kungmin Park, Young-in (KR)

(73) Assignee: Nokia Technologies Oy, Espoo (FI)

(*) Notice: Subject to any disclaimer, the term of this patent is extended or adjusted under 35 U.S.C. 154(b) by 14 days.

(21) Appl. No.: 16/493,065

(22) PCT Filed: Mar. 23, 2017

(86) PCT No.: PCT/CN2017/077903
§ 371 (c)(1),
(2) Date: Sep. 11, 2019

(87) PCT Pub. No.: WO2018/170846
PCT Pub. Date: Sep. 27, 2018

(65) Prior Publication Data
US 2020/0059384 A1 Feb. 20, 2020

(51) Int. Cl.
*H04L 25/02* (2006.01)
*H04L 5/00* (2006.01)
*H04B 1/7143* (2011.01)

(52) U.S. Cl.
CPC ....... *H04L 25/0226* (2013.01); *H04B 1/7143* (2013.01); *H04L 5/0007* (2013.01); *H04L 5/0051* (2013.01)

(58) Field of Classification Search
CPC . H04L 25/0226; H04L 5/0007; H04L 5/0051; H04B 1/7143
(Continued)

(56) References Cited

U.S. PATENT DOCUMENTS

2016/0337087 A1 11/2016 Chen et al.
2016/0352551 A1 12/2016 Zhang et al.
(Continued)

FOREIGN PATENT DOCUMENTS

CN 104283582 A 1/2015
EP 3584982 A1 12/2019
(Continued)

OTHER PUBLICATIONS

R1-1701818 (Year: 2017).*
(Continued)

*Primary Examiner* — Yemane Mesfin
*Assistant Examiner* — Intekhaab A Siddiquee
(74) *Attorney, Agent, or Firm* — Harrington & Smith

(57) ABSTRACT

A first method comprises sending to at least one user equipment a signal, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and receiving an SRS transmission from the at least one user equipment in accordance with the signal. A second method comprises receiving a signal from a gNB, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is
(Continued)

Hopping pattern on partial band level

Scheme 1: First transmission between partial bands then multiple transmission in one partial band Scheme 2: First multiple transmission in one partial band then transmission between partial bands made for each SRS resource; and sending an SRS transmission to the gNB in accordance with the signal.

19 Claims, 7 Drawing Sheets

(58) Field of Classification Search
USPC .......................................................... 370/329
See application file for complete search history.

(56) References Cited

U.S. PATENT DOCUMENTS

2017/0366311 A1* 12/2017 Iyer ....................... H04L 5/0007
2019/0372734 A1* 12/2019 Choi ...................... H04L 5/0048

FOREIGN PATENT DOCUMENTS

| WO | 2016/071148 | A1 | 5/2016 |
| WO | 2016/161738 | A1 | 10/2016 |
| WO | 2016/175981 | A1 | 11/2016 |
| WO | 2017/218794 | A1 | 12/2017 |

OTHER PUBLICATIONS 62350437P (Year: 2016).*
62458576P (Year: 2017).*
62373850P (Year: 2016).*
62399921p (Year: 2016).*
62401062p (Year: 2016).*

Office action received for corresponding Chinese Patent Application No. 201780086175.0, dated Sep. 18, 2010, 5 pages of office action and 3 pages of Translation available.
Extended European Search Report received for corresponding European Patent Application No. 17901659.7, dated Oct. 2, 2020, 8 pages.
"NR-SRS Design for UL Beam Management", 3GPP TSG RAN WG1 Meeting #88, R1-1702940, Agenda: 8.1.2.2.3, Samsung, Feb. 13-17, 2017, 4 pages.
Office action received for corresponding Japanese Patent Application No. 2019-544881, dated Oct. 5, 2020, 4 pages of office action and 4 pages of translation available.
"Further Discussion on SRS Transmission", 3GPP TSG RAN WG1 AH_NR meeting, R1-1700234, Agenda: 5.1.2.3.4, CATT, Jan. 16-20, 2017, 5 pages.
"UL SRS Design Considerations in NR", 3GPP TSG-RAN WG1 Meeting #86bis, R1-1610273, Agenda: 8.1.4.4, Nokia, Oct. 10-14, 2016, 4 pages.
"3rd Generation Partnership Project; Technical Specification Group Radio Access Network; Evolved Universal Terrestrial Radio Access (E-UTRA); Physical channels and modulation (Release 14)", 3GPP TS 36.211, V14.1.0, Dec. 2016, pp. 1-175.
Sesia et al., "LTE—The UMTS Long Term Evolution", Wiley Publication, 2011, 794 pages.
Nsenga et al., "Joint Transmit and Receive Analog Beamforming in 60GHz MIMO Multipath Channels", IEEE International Conference on Communications, Jun. 14-18, 2009, 5 pages.
International Search Report and Written Opinion received for corresponding Patent Cooperation Treaty Application No. PCT/CN2017/077903, dated Nov. 16, 2017, 11 pages.

* cited by examiner

ENHANCED SRS FREQUENCY HOPPING SCHEME FOR 5G NR

RELATED APPLICATION

This application was originally filed as PCT Application No. PCT/CN2017/077903 on Mar. 23, 2017.

TECHNICAL FIELD

This disclosure relates to 5G wireless systems with support for Massive MIMO (m-MIMO). Such systems are characterized by the use of a greater number of antennas, finer beamforming and higher antenna gain. More specifically, this disclosure relates to SRS frequency hopping for SRS using one or multiple partial bands, flexible precoding or beamforming at either or both the transmit and receive sides, and different numerology for SRS transmissions.

BACKGROUND

In an LTE system, the cell-specific SRS bandwidth configuration parameter $C_{SRS}$ and the UE-specific SRS bandwidth parameter $B_{SRS}$ are used to determine the sounding bandwidth for one UE. The tree structure is used for the sounding units of each sounding bandwidth configuration $B_{SRS}$, as shown in FIG. 1. The flexible sounding bandwidth can be configured for each UE on account of the distance between the UE and the gNB, UE capability, and so forth. To guarantee the channel estimation quality, four PRBs are used as the minimum sounding unit and hopping granularity. On account of limited power at the UE side, especially for cell edge UEs, frequency hopping can be used to sound the larger bandwidth with multiple times the sounding of a smaller bandwidth. The start position in the frequency domain is configured on the sounding unit level by high layer signalling $n_{RRC}$. Different start positions can be configured to avoid SRS collisions between UEs. When frequency hopping of the SRS is not enabled, the frequency position index remains constant, unless it is reconfigured. When frequency hopping of the SRS is enabled, the frequency location will be hopped according to a pattern or function, which is defined in detail in subsection 5.5.3.2 of TS 36.211. The SRS transmission opportunities are counted by $n_{SRS}$, which is determined by a subframe index and UE-specific SRS periodicity. The frequency location with hopping will be determined the counter parameter $n_{SRS}$ and a hopping pattern or function. For aperiodic SRS transmission, frequency hopping is not supported.

SRS hopping is currently a hot topic under discussion. For example, at the 3GPP RAN1 87 Adhoc meeting, it was agreed that configured frequency hopping is supported for SRS transmission in NR, but that the details require further study. In the 3GPP RAN1 88 meeting, it was agreed that SRS frequency hopping within a partial band is supported, but hopping among partial bands requires further study.

In the present disclosure, an enhanced SRS hopping scheme is proposed on account of possible one or multiple partial bands configuration, flexible precoding/beamforming at both transmit and/or receive side and multiple numerologies, beam pairs for SRS transmission.

For 5G NR, a flexible SRS hopping mechanism needs to be considered for scenarios with multiple numerologies and beams, which are not considered in the LTE system. Problems requiring attention are:

1) SRS Hopping for Multiple Partial Bands

From the conclusions of the RAN1 86b and RAN1 87 meetings, it was agreed that a configurable SRS bandwidth is supported in NR. Multiple partial bands can be configured for one UE and the size of partial band is configurable. Thus, the SRS hopping mechanism needs to consider the SRS configuration with multiple partial bands. With SRS hopping on multiple partial bands, the hopping scheme on partial band level needs to be considered.

For SRS hopping on multiple partial bands, the hopping scheme can be realized by two hopping modes. For the first hopping mode, one SRS sounding unit is just transmitted on the frequency resource from one partial band. It has good backward compatibility and the LTE hopping scheme can be reused in one partial band. For the second hopping mode, one SRS sounding unit can be transmitted on the frequency resources from multiple partial bands. It can obtain uplink CSI of multiple partial bands in one sounding, and provide some flexibility, especially in case of large sounding bandwidth configuration. But the PARP will be increased on account of non-continuous transmission. Thus, it depends on UE capability whether to support the second hopping mode. Unified hopping pattern design can be considered for both hopping modes.

For SRS hopping on multiple partial bands, flexible hopping granularity needs to be supported with good tradeoff between SRS overhead, sounding delay and available CSI for multiple bands. Independent bandwidth and sounding granularity for each partial band needs to be supported for the design of the SRS hopping scheme. Furthermore, the issue of frequency resource restriction can be further considered in case of hopping when some frequency resources are reserved for some special usage on account of forward compatibility.

2) SRS Hopping for SRS with Multiple Functions

SRS can be transmitted with the function of CSI acquisition and UL beam management in 5G NR. SRS hopping scheme in LTE is just designed for SRS with the function CSI acquisition, where SRS is continuously hopped for SRS transmission opportunity. For SRS with the function of UL beam management, the frequency hopping can be made after one scanning, where multiple symbols/subframes can be used for transmit/receive beam scanning. To unify hopping for these two kinds of SRS, time frequency two dimension hopping units can be considered.

These problems are addressed by the present invention, in which enhanced SRS hopping schemes are proposed, where SRS transmission with multiple numerologies or beams, one or multiple partial bands, and flexible precoding or beamforming are considered.

SUMMARY

In a first aspect of the present invention, a method comprises sending to at least one user equipment a signal, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and receiving an SRS transmission from the at least one user equipment in accordance with the signal.

In a second aspect of the present invention, an apparatus comprises at least one processor, and at least one memory including computer program code. The at least one memory and the computer program code are configured, with the at least one processor, to cause the apparatus to send to at least one user equipment a signal, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and to receive an SRS transmission from the at least one user equipment in accordance with the signal.

In a third aspect of the present invention, an apparatus comprises means for sending to at least one user equipment a signal, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and means for receiving an SRS transmission from the at least one user equipment in accordance with the signal.

In a fourth aspect of the present invention, a memory comprises a non-transitory computer-readable storage medium bearing computer program code embodied therein for use with a computer. The computer program code comprises code for sending to at least one user equipment a signal, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and receiving an SRS transmission from the at least one user equipment in accordance with the signal.

In a fifth aspect of the present invention, a method comprises receiving a signal from a gNB, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and sending an SRS transmission to the gNB in accordance with the signal.

In a sixth aspect of the present invention, an apparatus comprises at least one processor, and at least one memory including computer program code. The at least one memory and the computer program code are configured, with the at least one processor, to cause the apparatus to receive a signal from a gNB, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and to send an SRS transmission to the gNB in accordance with the signal.

In a seventh aspect of the present invention, an apparatus comprises means for receiving a signal from a gNB, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and means for sending an SRS transmission to the gNB in accordance with the signal.

In an eighth aspect of the present invention, a memory comprises a non-transitory computer-readable storage medium bearing computer program code embodied therein for use with a computer. The computer program code comprises code for receiving a signal from a gNB, the signal including hopping parameters and being related to sounding reference signal (SRS) transmission, wherein at least one subset/SRS resource is sent for at least one numerology/beam pair, and wherein independent hopping is carried out in each subset for one specific numerology/beam pair or, when different SRS resources are configured for different numerologies/beams, the subset is defined for each SRS resource and independent hopping is made for each SRS resource; and sending an SRS transmission to the gNB in accordance with the signal.

BRIEF DESCRIPTION OF THE DRAWINGS

The foregoing and other aspects of these teachings are made more evident in the following detailed description, when read in conjunction with the attached drawing figures.

DETAILED DESCRIPTION

As noted above, the aim of the present invention is to provide an enhanced SRS hopping scheme, which can provide flexible sounding for scenarios with possibly multiple numerologies/beams, one or multiple partial bands, and flexible precoding or beamforming. In the presently proposed scheme, the following aspects are discussed:
 1) SRS hopping scheme for SRS transmission with multiple numerologies and beam pairs;
 2) Unified flexible SRS hopping scheme to support multiple hopping modes;
 3) Unified two dimension sounding unit for the hopping of SRS for CSI acquisition and beam management; and
 4) Flexible resource configuration for SRS hopping by resource restriction for possible sounding hopping units.

1) Independent Hopping for SRS with Different Numerologies/Beams

NR supports different numerologies/beams for SRS transmission. It will have an impact on the details of the hopping scheme. If a conventional frequency hopping mechanism in the LTE system is used, the hopping is made continuously in the possible SRS transmission opportunity no matter the actual numerology/beam. It cannot guarantee to provide full CSI in a configured frequency domain for all numerologies/ beams.

Figure 1:
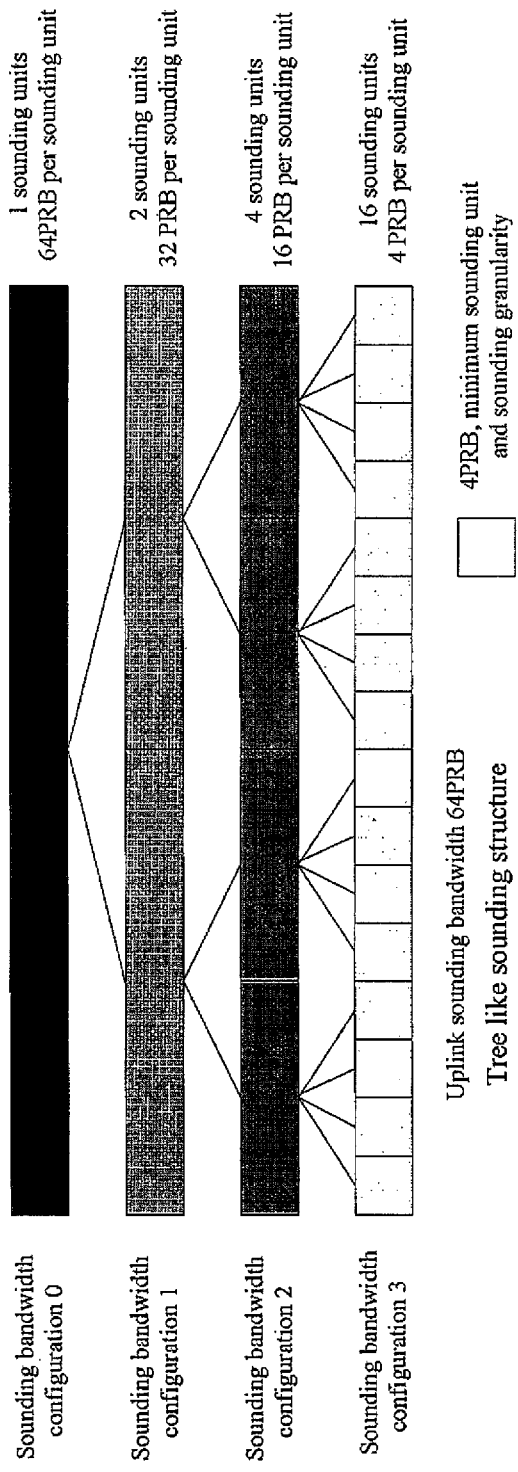
FIG. 1 is an illustration of a tree structure for sounding bandwidths of multiple configurations in a LTE system.
Figure 2:
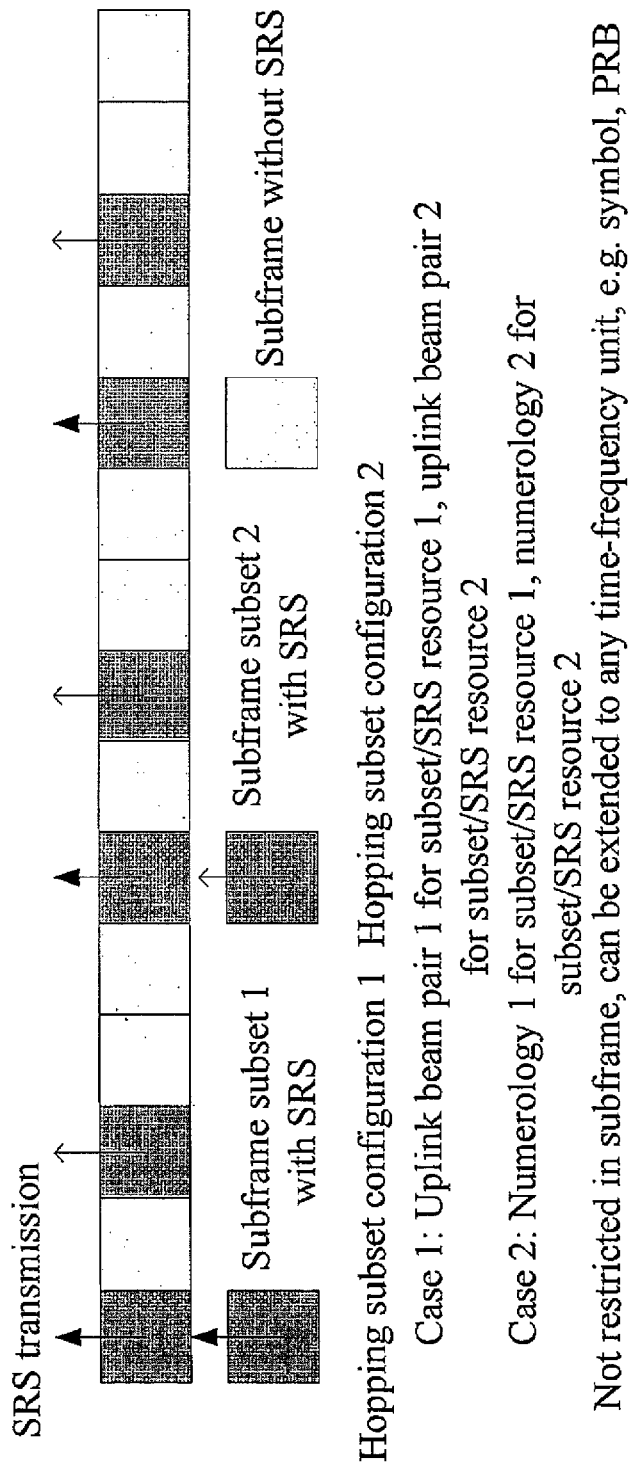
FIG. 2 provides an example of independent SRS hopping within subset/SRS resource for different numerologies/beams.

To provide enough CSI information for scheduling on possible numerologies/beams, it is proposed that independent hopping can be made for SRS transmission in different subsets, wherein independent SRS configuration can be used for different subsets. In one subset, one specific numerology/ beam is used for SRS transmission. As an example, shown in FIG. 2, different subsets are used for SRS transmission with different numerologies/beams. The SRS hopping is made independently in each subset according to the corresponding configuration. For the unit composing a subset for SRS transmission, it can be a subframe, OFDM symbol or even some predefined PRBs/Resource elements in one OFDM symbol. For different numerologies/beams, different SRS resources can be configured. When the subset is defined for each SRS resource, independent hopping can be made for each SRS resource. Furthermore, numerology/beam specific subset information needs exchanged between TRP (transmission/reception point)/cells to guarantee cross-TRP/ cell SRS reception.

2) SRS Hopping Pattern Design for Multiple Partial Bands

When UE is configured with multiple partial bands, one or multiple partial bands can be enabled for flexible hopping. For SRS hopping on multiple partial bands, two-level hopping can be used. The first level is hopping between partial bands and the second level is frequency hopping in the partial band. For the second-level hopping, the conventional scheme in the LTE system can be reused. The start position and hopping granularity can be configured independently for each partial band. For the first-level hopping, the hopping pattern on the partial band level needs specification.

The following work assumption is made when an SRS hopping pattern is designed on a partial band level: 1. The number of partial bands is configured and some large value can be supported; 2. The bandwidth for the partial bands can be configured and different partial bands may have different bandwidths; and 3. Hopping granularity in each partial band may be same or different.

To support flexible hopping for multiple partial bands, the following two hopping modes can be configured according to the actual requirement:

Mode 1: Partial band alternative hopping where PRBs in only one partial band are used for one SRS transmission.

This hopping mode is used to obtain full CSI of all the partial bands. When the statistics of channel state information are obtained, hopping on partial band level can be disabled and SRS is just transmitted on the band with good channel quality. It can naturally fall back to legacy hopping mechanism with one band/partial band.

Mode 2: Partial band interleaved hopping, where PRBs in multiple partial bands can be used for one SRS transmission.

This hopping mode is used to quickly obtain CSI of multiple partial bands for one sounding when a UE can support relatively high PAPR caused by simultaneous multiple partial band transmissions. The good frequency diversity property introduced by multiple partial bands can be exploited for scheduling or evaluation of the average uplink channel quality, especially in case of smaller SRS transmission number. It can be used for aperiodic multiple-shot SRS transmissions.

Figure 3A:
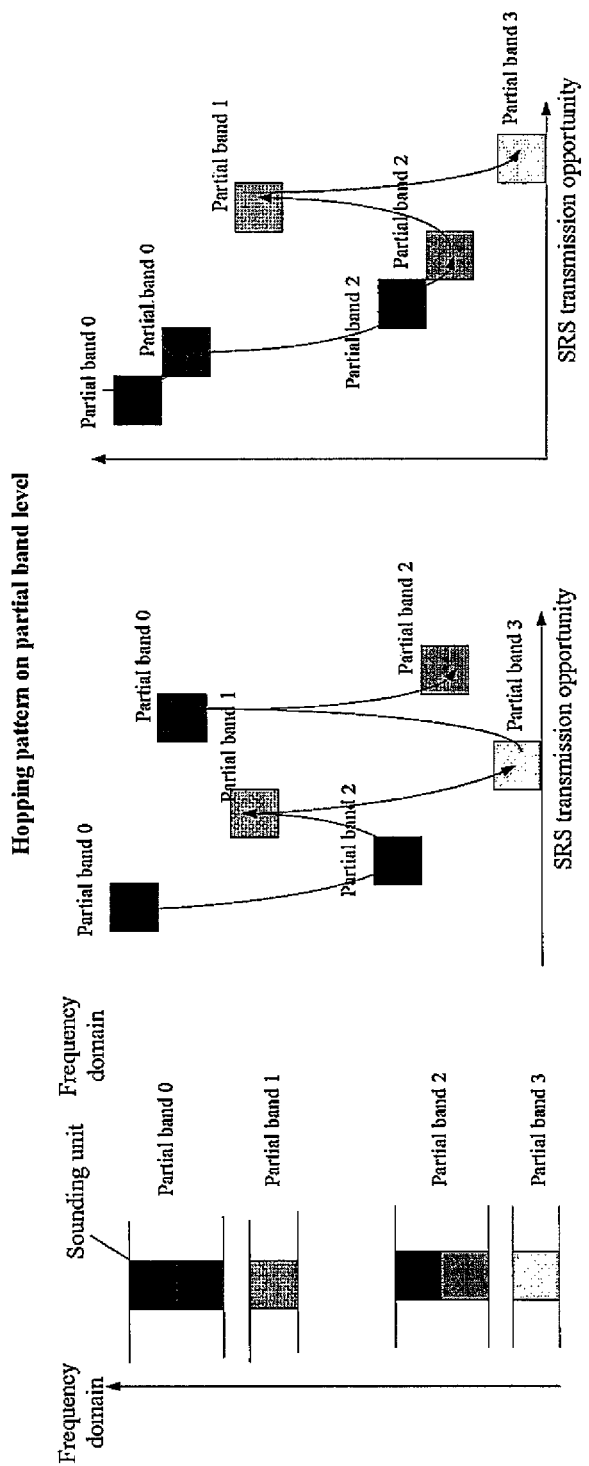
FIG. 3A is an illustration of SRS hopping pattern on partial band level.
Figure 3B:
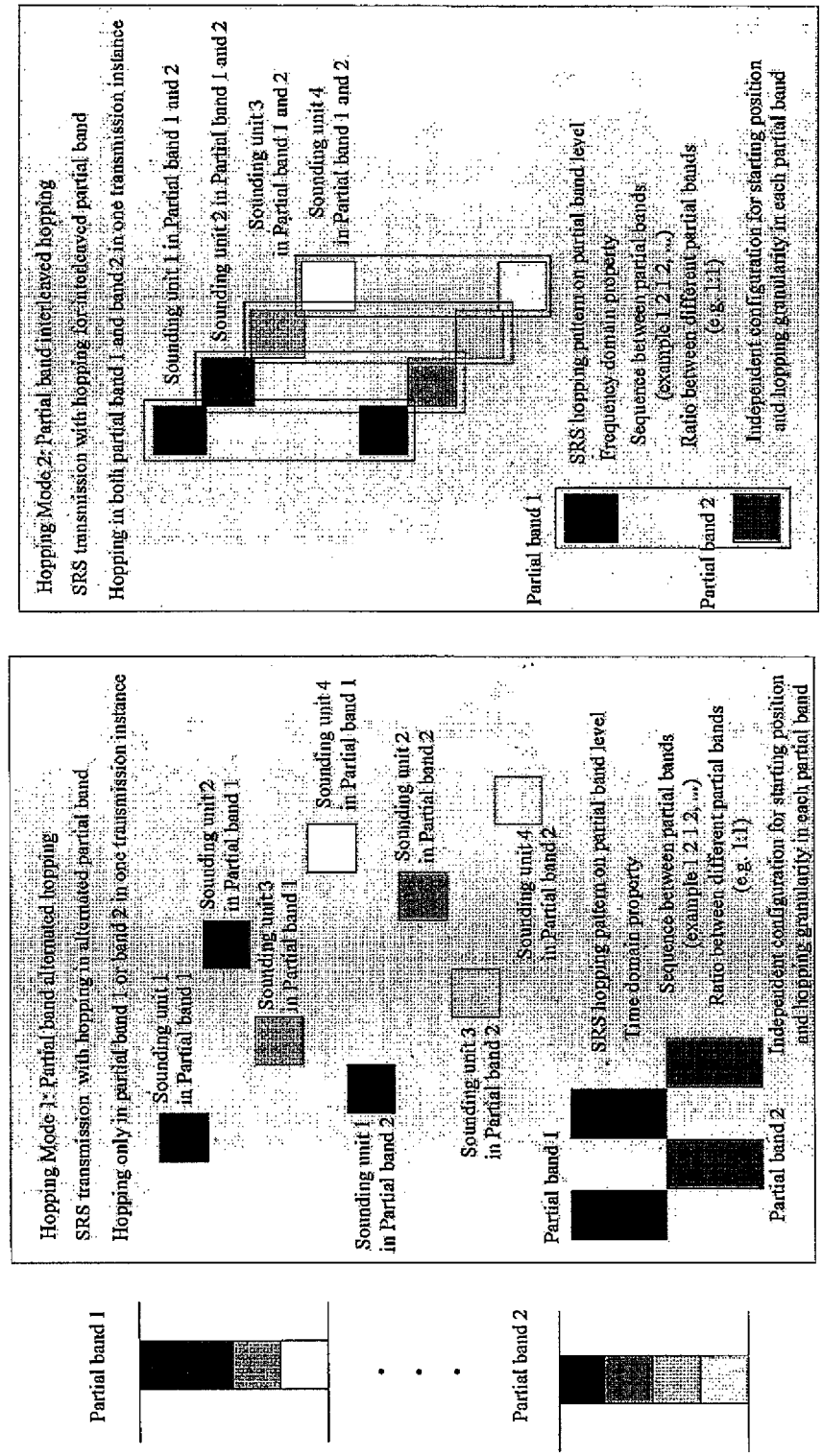
FIG. 3B is an illustration of SRS hopping pattern on partial band level for two hopping modes.

To support these two hopping modes, the SRS hopping pattern on partial band level needs to be defined. In detail, the patterns for two hopping modes can be unified with two configuration parameters, which are the hopping sequence for multiple partial bands and the transmission number ratio between different partial bands. For hopping sequence, it means the SRS transmission sequence (order) on multiple partial bands. The frequency space can be maximized to achieve frequency diversity for optimized hopping sequence. For transmission number ratio between partial bands, it means the ratio of SRS transmission (sounding) number for each of the partial bands. The transmission number ratio can be defined in the order of partial band or the order corresponding to the hopping sequence. The bandwidth of partial band and hopping granularity for each partial band can be considered for its configuration. To guarantee uniform sounding for multiple partial bands, more sounding opportunities can be used for the partial band with larger bandwidth when the same hopping granularity is used. The whole picture of hopping pattern can be obtained with combination of these two parameters. One example is given in FIG. 3A for illustration of a hopping pattern on a partial band level, where the hopping sequence for multiple partial bands can be: partial band 0, partial band 2, partial band 1, partial band 3; there are four partial bands; the transmission number ratio between different partial bands can be 2:1:2:1 when the ratio for bandwidth of each partial band is 2:1:2:1 and the same hopping granularity is used for each partial band. The final SRS hopping pattern on partial band level is: scheme 1: Partial band 0, Partial band 2, Partial band 1, Partial band 3, Partial band 0, Partial band 2 for scheme 1 where hopping is made firstly with transmission between partial bands and then multiple transmission in one partial band; scheme 2: partial band 0, Partial band 0, Partial band 2, Partial band 2, Partial band 1, Partial band 3 where hopping is made firstly multiple transmission in one partial band and then transmission between partial bands. As another example shown in FIG. 3B, hopping pattern, [partial band 0, partial band 1, partial band 0, partial band 1], is used for both hopping modes. For hopping mode 1 and 2, the hopping pattern is defined in time domain and frequency domain, respectively.

When a partial-band hopping scheme is used, the following rational can be considered:

1. For design or configuring hopping sequence, the frequency space between different hops can be maximized to achieve large frequency diversity;
2. For configuring transmission number ratio between partial bands, same sounding time for whole partial-band sounding can be guaranteed for multiple partial bands. It will be beneficial for a gNB to obtain the CSI for all partial bands for scheduling.

Of course, the difference for sounding between different partial bands can be realized by transmission number and hopping granularity for each partial band. For example, when a gNB wants to know more/fast CSI for specific partial band, finer hopping granularity and/or more transmission number can be configured for this specific partial band.

This differential configuration method can be used together with hopping unit level frequency resource restriction scheme in proposal 4. For example, if some frequency resource for hopping is restricted, the sounding speed for unrestricted frequency resource will become fast. It will be useful for such a case that there is deep fading/strong interference in the frequency domain. For the deep-fading/ strong-interference frequency domain, there is no need for SRS transmission because of no data transmission. With different configuration of frequency resource restriction for different partial bands, the sounding scheme will be more efficient because of avoiding unnecessary sound region.

3) Configured Time Frequency Two Dimension SRS Hopping Units

Figure 4:
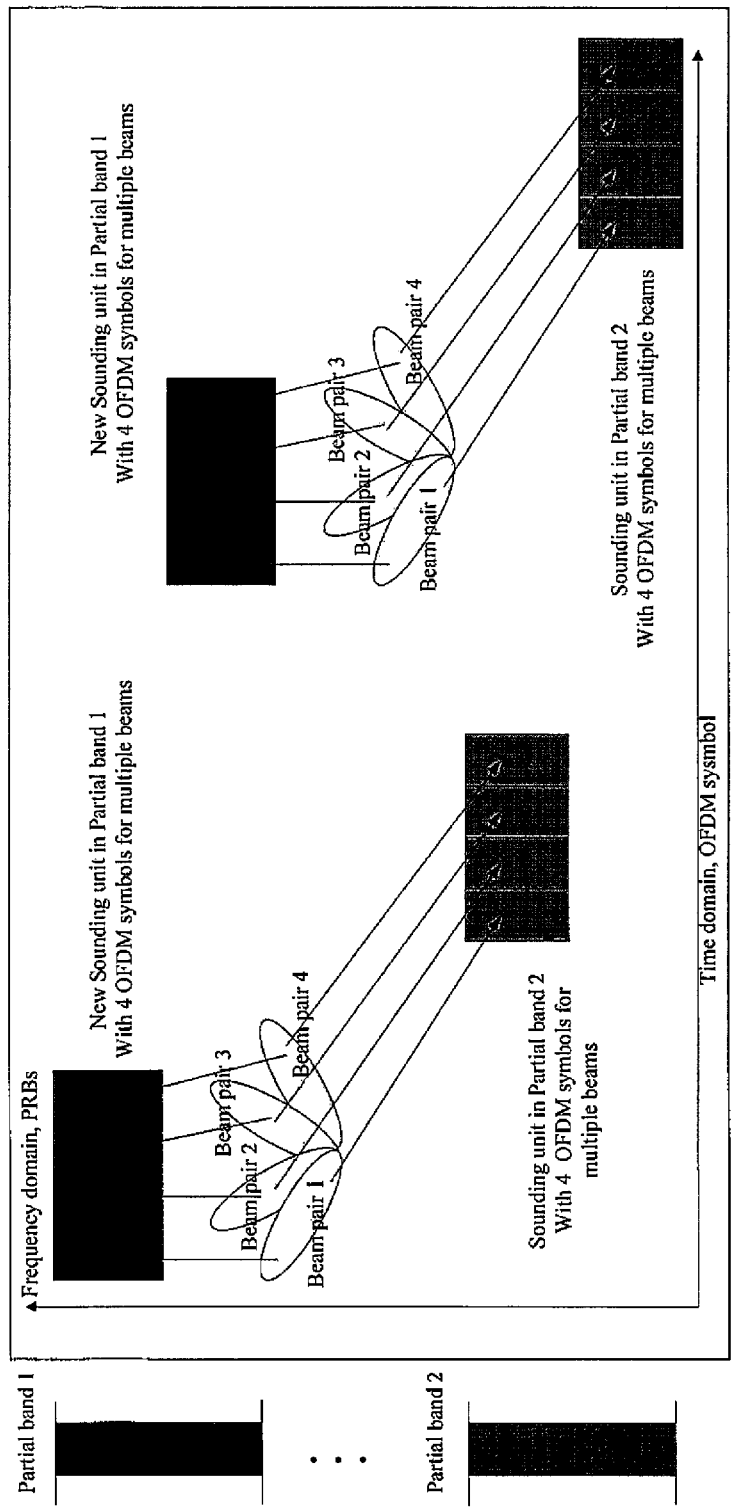
FIG. 4 is an illustration of time frequency two dimension hopping unit.

SRS can be transmitted for uplink beam management. In this case, multiple times of SRS transmission can be used for beam sweeping, including transmit beam and receive beam sweeping. As shown in FIG. 4, SRS in four OFDM symbols are used for beam sweeping. To keep fair comparison for the channel quality of different beams, it is required to obtain the channel quality information of the same frequency resource during one beam sweeping period. Therefore, it is proposed to extend SRS hopping unit concept to time frequency two dimension. That means that one SRS hopping unit includes part of frequency resources in multiple SRS transmission instances. For this new SRS hopping unit, the SRS transmission instance in the hopping unit can be configured. As an example shown in FIG. 4, SRS hops by two dimension hopping unit with four OFDM symbols.

4) Flexible Hopping with Restriction for Sounding Hopping Units

Figure 5:
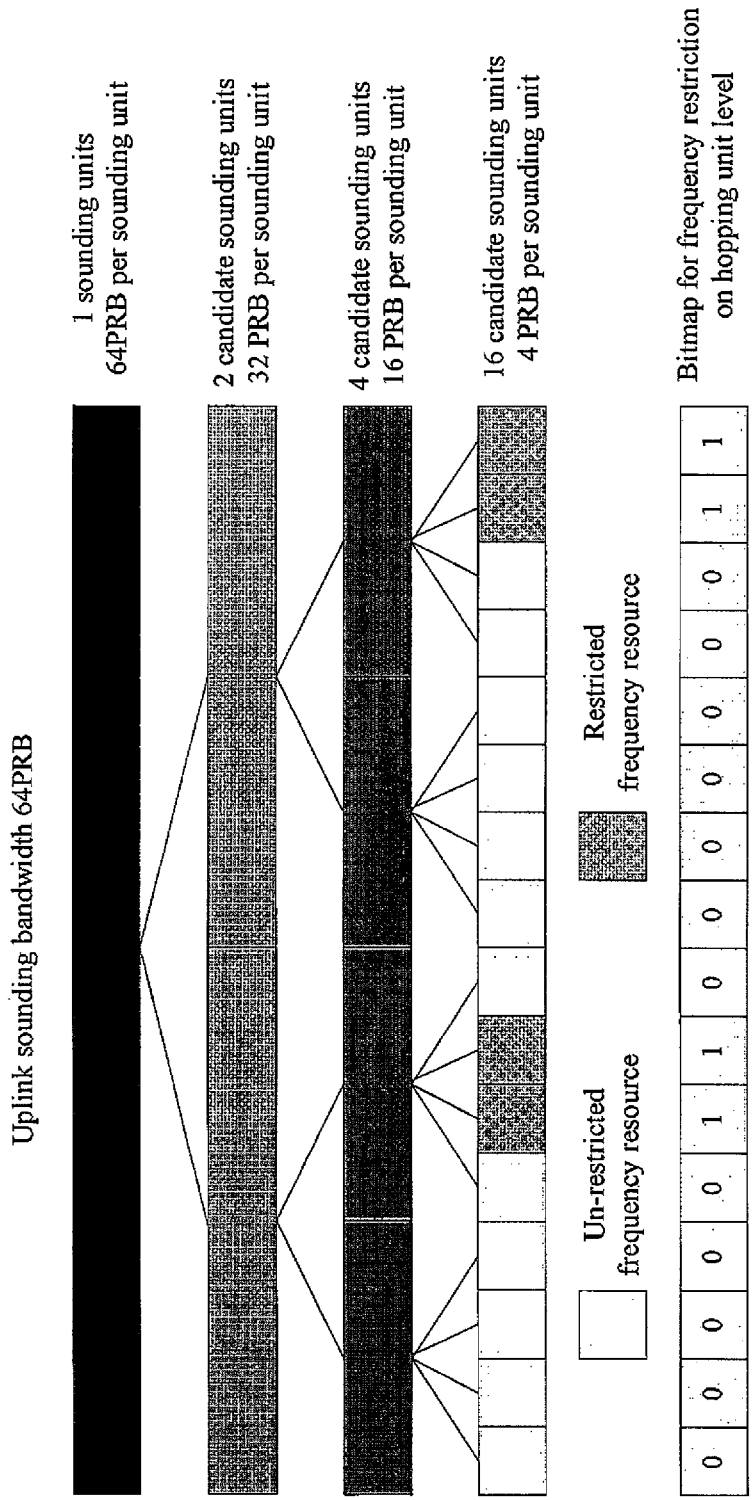
FIG. 5 is an illustration of frequency restriction on hopping unit level for SRS hopping.

In 5G NR, the usage of frequency resources will be more flexible. For forward compatibility, some range in frequency domain can be configured for special use. Currently in the LTE system, SRS hopping is made in configured bandwidth. It has no flexibility of hopping with escaping part of frequency range in the configured bandwidth. Therefore, it is proposed to introduce optional signaling to provide flexible hopping on selected frequency resources in the configured bandwidth. When the tree structure is used for the sounding unit in different bandwidth configurations, the possible frequency location can be determined by the candidate hopping units. The number of candidate hopping units is determined by hopping bandwidth $b_{hop}$, and configured SRS bandwidth, $C_{SRS}$ and $B_{SRS}$, partial band bandwidth $N^{UL}_{RB}$. As an example, shown in FIG. 5, the number of the candidate hopping units is $N_0 \times N_1 \times N_2 \times N_3 = 16$ in case of $C_{SRS}=1$, $B_{SRS}=3$, $b_{hop}=0$, $60 \leq N^{UL}_{RB} \leq 80$ according to configuration parameters from the LTE system. The proposed restriction signaling can be a bitmap for candidate hopping units. In detail, the bit value for hopping unit will set 1 when its corresponding frequency resource cannot be used for SRS transmission. When multiple partial bands are configured, the proposed restriction signaling will be partial band specific.

In view of the preceding discussion, the present invention is characterized by:

1) Introducing independent SRS hopping within subset/SRS resource for different numerologies/beams;
   a. numerology/beam specific subset information is exchanged between TRP/cells for cross-TRP/cell SRS reception
2) SRS hopping pattern on partial band level to support two hopping modes where the configuration parameters for hopping pattern include hopping sequence and the transmission number ratio for multiple partial bands;
3) Time frequency two dimension SRS hopping unit with configurable time instance length for uplink beam measurement; and
4) Signaling indication of frequency resource restriction on hopping unit level for SRS hopping.

In accordance with the present invention, the gNB sends to UEs the related signaling including hopping parameters for SRS transmission. UE transmits SRS according to gNB's indication. The procedure in detail is as follows:

1. gNB sends SRS transmission parameters in time domain, including UE-specific SRS periodicity $T_{SRS}$ and subframe offset configuration $T_{offset}$;
2. gNB sends multiple subsets/SRS resources for multiple numerologies/beam pairs;
   A. Independent hopping in each subset for one specific numerology/beam pair;
   B. When different SRS resources are configured for different numerologies/beams, the resource subset can be defined for each SRS resource and independent hopping is made for each SRS resource;
   C. The counter for SRS transmission opportunity should be made for each configured subset/SRS resource independently;
   D. The unit for composing subset can be one subframe or one OFDM symbol or some PRBs/REs in one OFDM symbol;
   E. Numerology/beam specific subset information is exchanged between TRP/cells for cross-TRP/cell SRS reception.
3. gNB sends configuration information for frequency hopping on partial band level
   A. gNB sends one or multiple partial band configuration signaling, including the start position and bandwidth for each partial band;
   B. gNB sends partial bands hopping-enabling signaling. UE just makes hopping on the partial bands with enabling hopping mode. Otherwise, UE transmits SRS on the start partial band;
   C. gNB sends configuration for hopping pattern on partial band level. It includes hopping mode, hopping sequence between partial bands and the transmission number ratio between different partial bands.
      i. For hopping sequence, another alternative can be implicitly determined by the rule of maximizing frequency space between sounding units. The hopping sequence can be determined based on the following Table 1 according to partial band number M and the start position k for hopping;
      ii. The transmission number ratio between different partial bands can be flexibly configured according to bandwidth of partial band and hopping granularity for each partial band;
      iii. The hopping pattern for the configured hopping mode can be determined with combination of hopping sequence and transmission number ratio.

TABLE 1

Hopping sequence for multiple partial bands

| Partial band number | Hopping sequence in case of k = 0 | Hopping sequence in case of k for start position |
| --- | --- | --- |
| M = 2 | [0 1] . . . | Mod([k k + 1], 2) . . . |
| M = 3 | [0 1 2] . . . | Mod([k k + 1 k + 2], 3) . . . |
| M = 4 | [0 2 1 3] . . . | Mod([k k + 2 k + 1 k + 3], 4) . . . |
| M = 5 | [0 2 4 1 3] . . . | Mod([k k + 2 k + 4 k + 1 k + 3], 5) . . . |

4. gNB sends configuration information for frequency hopping for each partial band
   A. gNB sends SRS hopping bandwidth information including configured SRS bandwidth $C_{SRS}$ and $B_{SRS}$ for each partial band;
   B. gNB configures the hopping granularity, start position for hopping unit and hopping bandwidth $b_{hop}$ for each partial band;

C. The hopping pattern can be determined according to the LTE hopping mechanism defined in TS36.211;

D. If some frequency resources in the partial band are not used for SRS transmission, gNB sends frequency resource restriction signaling on hopping unit level. The SRS transmission with hopping will escape the restricted frequency resources;

E. When SRS is used for beam management, gNb configures multiple time instances for hopping. With this configuration, the sounding unit will be extended to multiple transmission instances. SRS transmission will not hop in one beam scanning period and the same frequency resource is used in one beam scanning period.

5. UE Makes SRS Transmission According to gNB's Indication.

The enhanced power control scheme of the present invention offers several benefits. It supports SRS hopping for different numerologies/beam pairs, and provides a unified hopping pattern on partial band level to support multiple hopping modes. Further, it provides an effective hopping mechanism for beam management SRS, and a flexible frequency resource restriction mechanism for SRS hopping. In addition, the UE's behavior for SRS hopping may be changed according to the gNB signaling indication.

Figure 6:
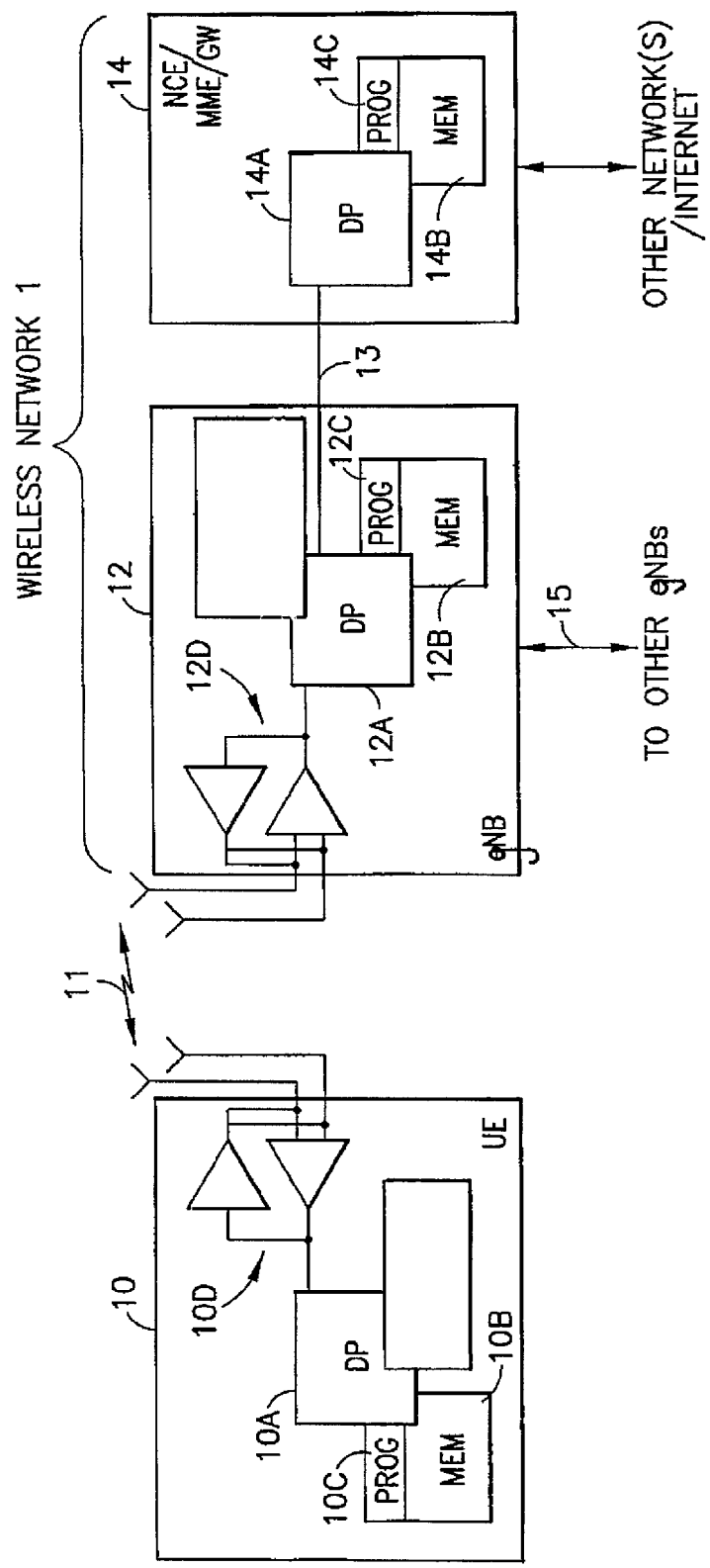
FIG. 6 shows a simplified block diagram of certain apparatus according to various exemplary embodiments of the present invention.

Reference is now made to FIG. 6 for illustrating a simplified block diagram of various electronic devices and apparatus that are suitable for use in practicing the exemplary embodiments of the present invention. In FIG. 6, a wireless network 1 is adapted for communication over a wireless link 11 with an apparatus, such as a mobile communication device, which is referred to as a UE 10, via a wireless network access node, such as a base station or relay station or remote radio head, and more specifically shown as a gNodeB 12. The network 1 may include a network control element (NCE) 14, which serves as a mobility management entity (MME) and/or a serving gateway (S-GW) to a broader network, such as a public switched telephone/data network and/or the Internet.

The UE 10 includes a controller, such as a computer or a data processor (DP) 10A, a computer-readable memory medium embodied as a memory (MEM) 10B, which stores a program of computer instructions (PROG) 10C, and a suitable radio frequency (RF) transmitter and receiver 10D for bi-directional wireless communications with the gNodeB (gNB) 12 via one or more antennas. The gNodeB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNodeB 12 is coupled via a data/control path 13 to the NCE 14. The path 13 may be implemented as an S1 interface when the network 1 is an LTE network. The gNodeB 12 may also be coupled to another gNodeB via data/control path 15, which may be implemented as an X2 interface when the network 1 is an LTE network.

At least one of the PROGs 10C and 12C is assumed to include program instructions that, when executed by the associated DP, enable the device to operate in accordance with the exemplary embodiments of this invention as was detailed above with respect to FIGS. 2 to 5. That is, the exemplary embodiments of this invention may be implemented at least in part by computer software executable by the DP 10A of the UE 10 and/or by the DP 12A of the eNodeB 12, or by hardware, or by a combination of software and hardware (and firmware).

In general, the various embodiments of the UE 10 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

It should be noted that the various DPs 10A, 12A may be implemented as one or more processors/chips, either or both of the UE 10 and the gNodeB 12 may include more than one transmitter and/or receiver 10D, 12D, and particularly the gNodeB 12 may have its antennas mounted remotely from the other components of the gNodeB 12, such as for example tower-mounted antennas.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

The following abbreviations have been used in the preceding discussion:
m-MIMO Massive Multiple-Input Multiple Output
SRS Sounding Reference Signal
BS Base Station
gNB gNode-B
UE User equipment
RSRP Reference Signal Received Power
SC-FDMA Single Carrier Frequency Division Multiple Access
CP-OFDM Cyclic Prefix Orthogonal Frequency Division Multiplexing
OFDM Orthogonal Frequency Division Multiplex
PAPR Peak to Average Power Ratio
CSI Channel State Information The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. An apparatus comprising:
   at least one processor; and
   at least one memory including computer program code, the at least one memory and the computer program code configured, with the at least one processor, to cause the apparatus to perform the following:
   send to at least one user equipment a signal, said signal including frequency hopping parameters and being related to sounding reference signal (SRS) transmission, wherein at least one subset of SRS resources is allocated for at least one numerology wherein:
   different SRS resources are configured for different numerologies, each subset corresponds to one SRS resource, and independent frequency hopping configurations are carried out for each SRS resource using the frequency hopping parameters,
   configuration information for frequency hopping is sent to enable the independent frequency hopping configurations to be carried out on a partial band level for the different SRS resources; and
   receive an SRS transmission from the at least one user equipment in accordance with said signal.

2. The apparatus of claim 1, wherein a unit for composing a subset is one of: one subframe, one OFDM symbol, one or more physical resource blocks, and resource elements in one OFDM symbol.

3. The apparatus of claim 1, wherein numerology subset information is exchanged between transmission/reception points (TRP) or cells for cross-TRP or cross-cell SRS reception.

4. The apparatus of claim 1, wherein one or multiple partial band configuration signals, including start position and bandwidth, are sent as part of the configuration information for each partial band, and wherein a partial bands frequency hopping-enabling signal is sent, so that the at least one user equipment is configured to perform frequency hopping on the partial bands with an enabling frequency hopping mode.

5. The apparatus of claim 1, wherein the configuration information includes a frequency hopping sequence between partial bands, and a transmission number ratio between different partial bands that indicates how many transmissions are performed in each partial band.

6. The apparatus of claim 1, wherein SRS frequency hopping bandwidth information including configured cell-specific SRS bandwidth configuration parameter CSRS and UE-specific SRS bandwidth parameter BSRS is sent for each partial band; or a frequency hopping granularity, start position for frequency hopping unit and frequency hopping bandwidth bhop is configured for each partial band; or a frequency hopping pattern can be determined according to a Long Term Evolution (LTE) frequency hopping mechanism defined in 3GPP TS 36.211.

7. The apparatus of claim 6, wherein, when one or more frequency resources in a partial band are not used for SRS transmission, frequency resource restriction signaling is sent on a frequency hopping unit level to indicate an SRS transmission with hopping will escape restricted frequency resources.

8. A method comprising:
   receiving a signal from a wireless network access node, said signal including frequency hopping parameters and being related to sounding reference signal (SRS) transmission, wherein at least one subset of SRS resources is allocated for at least one numerology wherein:
   different SRS resources are configured for different numerologies, each subset corresponds to one SRS resource, and independent frequency hopping configurations are carried out for each SRS resource using the frequency hopping parameters;
   configuration information for frequency hopping is received to enable the independent frequency hopping configurations to be carried out on a partial band level for the different SRS resources; and sending an SRS transmission to the wireless network access node in accordance with said signal.

9. The method of claim 8, wherein a unit for composing a subset is one of: one subframe, one OFDM symbol, one or more physical resource blocks, and resource elements in one OFDM symbol.

10. The method of claim 8, further comprising:
receiving, as part of the configuration information, one or multiple partial band configuration signals, including start position and bandwidth, for each partial band;
receiving a partial bands frequency hopping-enabling signal; and
performing frequency hopping on the partial bands with an enabled frequency hopping mode.

11. The method of claim 10, wherein there are multiple enabled frequency hopping modes, a first mode wherein the configuration information enables the frequency hopping to be partial band alternative hopping where SRS resources in only one partial band are used for one SRS transmission, and a second mode wherein the configuration information enables the frequency hopping to be partial band interleaved hopping where SRS resources in multiple partial bands are used for one SRS transmission, and wherein the partial bands frequency hopping-enabling signal selects one of the modes.

12. The method of claim 8, wherein SRS frequency hopping bandwidth information including configured cell-specific SRS bandwidth configuration parameter CSRS and UE-specific SRS bandwidth parameter BSRS is received for each partial band; or a frequency hopping granularity, start position for frequency hopping unit and frequency hopping bandwidth bhop is configured for each partial band; or a frequency hopping pattern can be determined according to a Long Term Evolution (LTE) frequency hopping mechanism defined in 3GPP TS 36.211.

13. The method of claim 8, wherein the configuration information enables the frequency hopping to be partial band alternative hopping where SRS resources in only one partial band are used for one SRS transmission.

14. The method of claim 8, wherein the configuration information enables the frequency hopping to be partial band interleaved hopping where SRS resources in multiple partial bands are used for one SRS transmission.

15. The method of 12, wherein, when one or more frequency resources in a partial band are not used for SRS transmission, frequency resource restriction signaling is received on a frequency hopping unit level to indicate an SRS transmission with hopping will escape restricted frequency resources.

16. An apparatus comprising:
at least one processor; and
at least one memory including computer program code, the at least one memory and the computer program code configured, with the at least one processor, to cause the apparatus to perform the following:
receive a signal from a wireless network access node, said signal including frequency hopping parameters and being related to sounding reference signal (SRS) transmission, wherein at least one subset of SRS resources is allocated for at least one numerology wherein:
when different SRS resources are configured for different numerologies, each subset corresponds to one SRS resource, and independent frequency hopping configurations are carried out for each SRS resource using the frequency hopping parameters;
configuration information for frequency hopping is received to enable the independent frequency hopping configurations to be carried out on a partial band level for the different SRS resources; and
send an SRS transmission to the wireless network access node in accordance with said signal.

17. The apparatus of claim 16, wherein a unit for composing a subset is one of: one subframe, one OFDM symbol, one or more physical resource blocks, and resource elements in one OFDM symbol.

18. The apparatus of claim 16, wherein the at least one memory and the computer program code are also configured to, with the at least one processor, cause the apparatus at least to:
receive, as part of the configuration information, one or multiple partial band configuration signals, including start position and bandwidth, for each partial band;
receive a partial bands frequency hopping-enabling signal; and
perform frequency hopping on the partial bands with an enabled frequency hopping mode.

19. The apparatus of claim 16, wherein SRS frequency hopping bandwidth information including configured cell-specific SRS bandwidth configuration parameter CSRS and UE-specific SRS bandwidth parameter BSRS is received for each partial band; or a frequency hopping granularity, start position for frequency hopping unit and frequency hopping bandwidth bhop is configured for each partial band; or a frequency hopping pattern can be determined according to a Long Term Evolution (LTE) frequency hopping mechanism defined in 3GPP TS 36.211.

* * * * *